United States Patent
Kamdar et al.

(10) Patent No.: US 7,130,633 B2
(45) Date of Patent: Oct. 31, 2006

(54) METHOD AND SYSTEM FOR ESTABLISHING COMMUNICATION TO A MOBILE MODULE

(75) Inventors: Hitan S. Kamdar, Utica, MI (US); Russell A. Patenaude, Macomb Township, MI (US); Anthony J. Sumcad, Southfield, MI (US); Shpetim S. Veliu, Livonia, MI (US); Brad T. Reeser, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 256 days.

(21) Appl. No.: 10/738,461

(22) Filed: Dec. 17, 2003

(65) Prior Publication Data

US 2005/0136978 A1 Jun. 23, 2005

(51) Int. Cl.
*H04Q 7/20* (2006.01)
(52) U.S. Cl. ............... 455/445; 455/3.04; 455/560

(58) Field of Classification Search ........ 455/415–418, 455/558, 445, 3.04, 428, 560
See application file for complete search history.

(56) References Cited

U.S. PATENT DOCUMENTS 6,311,065 B1 * 10/2001 Ushiki et al. ............... 455/440
6,675,008 B1 * 1/2004 Paik et al. .................. 455/415

* cited by examiner

*Primary Examiner*—CongVan Tran
(74) *Attorney, Agent, or Firm*—Cardinal Law Group

(57) ABSTRACT

The current invention provides a method and system for establishing communication to a mobile module. A plurality of call signals is initiated into the mobile module from a plurality of remote communication devices based on a timed sequence. Which of the plurality of call signals has established communication with the mobile module is determined. The call signals that have not established communication are terminated based on the determination. A computer usable medium with suitable computer program code is employed for establishing communication to a mobile module.

16 Claims, 5 Drawing Sheets

METHOD AND SYSTEM FOR ESTABLISHING COMMUNICATION TO A MOBILE MODULE

FIELD OF THE INVENTION

This invention relates generally to telematics systems. In particular the invention relates to a method and system for establishing communication to a mobile module.

BACKGROUND OF THE INVENTION

One of the fastest growing areas of communications technology is related to automobile network solutions. The demand and potential for wireless vehicle communication, networking and diagnostic services have recently increased. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call-center information, update controller systems, determine vehicle location, assist in tracking vehicle after a theft of the vehicle and provide other vehicle-related services. Drivers can call telematics call centers and receive navigational, concierge, emergency, and location services, as well as other specialized help such as locating the geographical position of a stolen vehicle and honking the horn of a vehicle when the owner cannot locate it in a large parking garage. Telematics service providers can offer enhanced telematics services by supplying a subscriber with a digital handset.

A call is received at a call center from a subscriber requesting a service. Call centers provide services to the subscriber by sending a call signal from the call center to the telematics unit in the vehicle. The vehicle must be in a standby mode or awake mode to receive the call signal. A telematics unit will remain in the standby mode for several hours after the vehicle ignition is turned off. After the standby mode is exited the telematics unit goes into a sleep/wake cycle. In one sleep/wake cycle the telematics unit is in a sleep mode for 9 minutes followed by a wake mode for 1 minute. This cycle will repeat for several hours before the telematics unit enters a continuous sleep mode. It is difficult to communicate with the telematics unit during the wake/sleep cycle, since the call center must send a call signal when the telematics unit is in the wake mode to successfully establish communication with the telematics unit.

Cellular activity and other network traffic can cause a communication device to become unavailable. Device availability effects the ability of the call center to establish communication with the telematics unit. A subscriber must wait for the call center to establish communication with the telematics unit before the service is provided.

It is desirable therefore, to provide a method and system for establishing communication to a mobile module, that overcomes the challenges and obstacles described above.

SUMMARY OF THE INVENTION

The current invention provides a method for establishing communication to a mobile module. A plurality of call signals is initiated into the mobile module from a plurality of remote communication devices based on a timed sequence. Which of the plurality of call signals has established communication with the mobile module is determined. The call signals that have not established communication are terminated based on the determination.

Another aspect of the current invention provides a computer usable medium including computer program code for establishing communication to a mobile module. The computer program code comprises: computer program code for initiating a plurality of call signals into the mobile module from a plurality of remote communication devices based on a timed sequence, computer program code for determining which of the plurality of call signals has established communication with the mobile module, and computer program code for terminating the call signals that have not established communication based on the determination.

Another aspect of the current invention provides a system for establishing communication to a mobile module. The system comprises means for initiating a plurality of call signals into the mobile module from a plurality of remote communication devices based on a timed sequence, means for determining which of the plurality of call signals has established communication with the mobile module, and means for terminating the call signals that have not established communication based on the determination.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
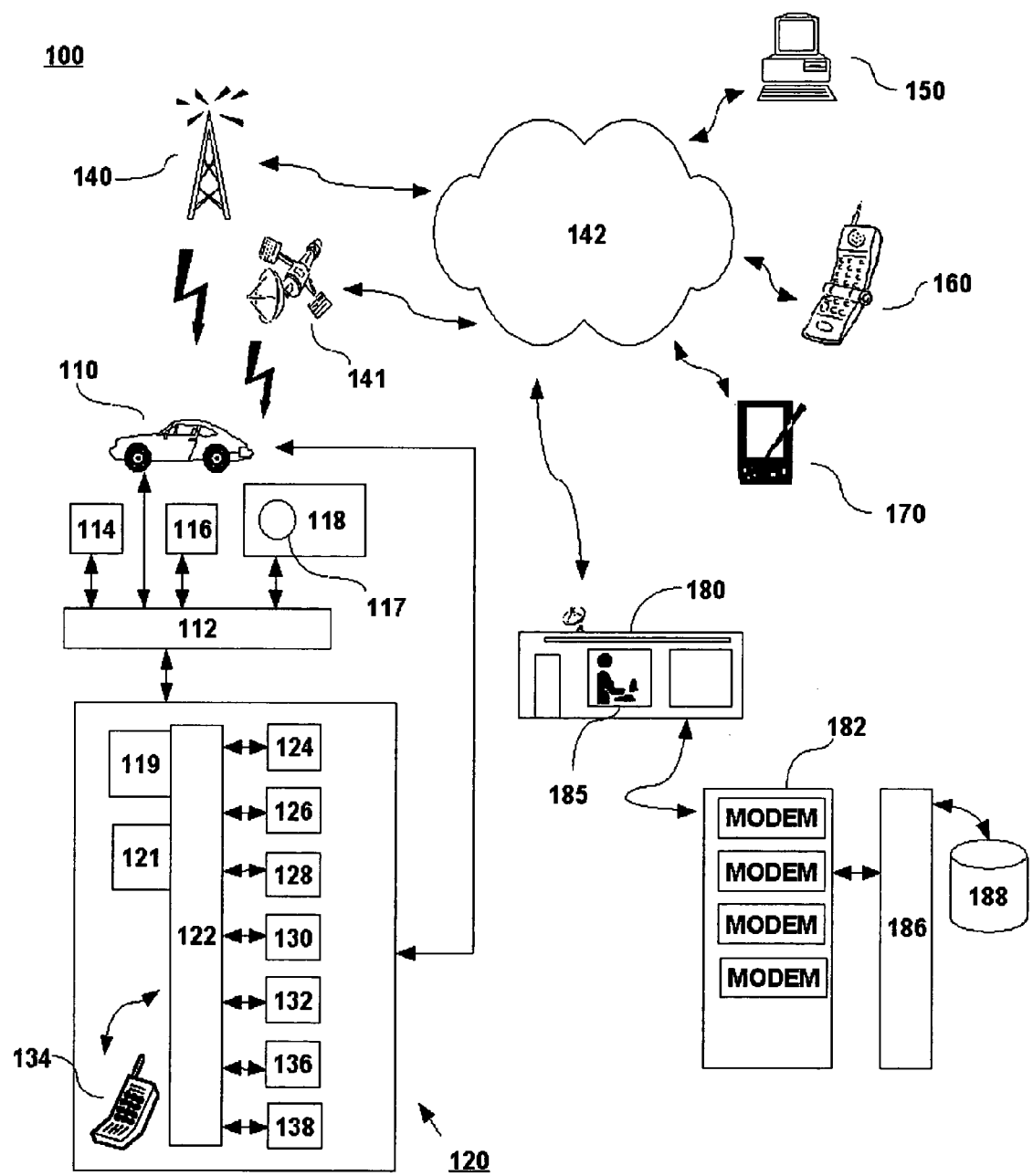
FIG. 1 is a schematic diagram of a system for establishing communication to a mobile module in accordance with one embodiment of the current invention.

FIG. 1 is a schematic diagram of a system for establishing communication to a mobile module in accordance with one embodiment of the current invention at 100. The system for establishing communication to a mobile module at 100 comprises: a mobile vehicle 110, a telematics unit 120, one or more wireless carrier systems 140, or one or more satellite carrier systems 141, one or more communication networks 142, and one or more call centers 180. Mobile vehicle 110 is a vehicle such as a car or truck equipped with suitable hardware and software for transmitting and receiving speech and data communications. Vehicle 110 has a multimedia system 118 having one or more speakers 117.

In one embodiment of the invention, telematics unit comprises: a digital signal processor (DSP) 122 connected to a wireless modem 124; a global positioning system (GPS) receiver or GPS unit 126; an in-vehicle memory 128; a microphone 130; one or more speakers 132; an embedded or in-vehicle phone 134 or an email access appliance 136; and a display 138. DSP 122 is also referred to as a microcontroller, controller, host processor, ASIC, or vehicle communications processor. GPS unit 126 provides longitude and latitude coordinates of the vehicle, as well as a time stamp and a date stamp. In-vehicle phone 134 is an analog, digital, dual-mode, dual-band, multi-mode or multi-band cellular phone.

Telematics unit 120 can store service center GPS location data, automatic number identification tables and other data files in in-vehicle memory 128. Telematics unit 120 can set or reset calling-state indicators and can enable or disable various cellular-phone functions, telematics-unit functions and vehicle functions when directed by program code running on DSP 122. Telematics unit 120 can send and receive over-the-air messages using, for example, a pseudo-standard air-interface function or other proprietary and non-proprietary communication links.

DSP 122 executes various computer programs and computer program code, within telematics unit 120, which control programming and operational modes of electronic and mechanical systems. DSP 122 controls communications between telematics unit 120, wireless carrier system 140 or satellite carrier system 141 and call center 180. A speech-recognition engine 119, which can translate human speech input through microphone 130 to digital signals used to control functions of telematics unit, is installed in telematics unit 120. The interface to telematics unit 120 includes one or more buttons (not shown) on telematics unit 120, on multimedia system 118, or on an associated keyboard or keypad that are also used to control functions of telematics unit. A text to speech synthesizer 121 can convert text strings to audible messages that are played through speaker 132 of telematics unit 120 or through speakers 117 of multimedia system 118.

Speech recognition engine 119 and buttons are used to activate and control various functions of telematics unit 120. In one embodiment, the interface to telematics unit 120 includes other forms of preference and data entry including touch-screens, wired or wireless keypad remotes, or other wirelessly connected devices such as Bluetooth-enabled devices or 802.11-enabled devices.

DSP 122 controls, generates and accepts digital signals transmitted between telematics unit 120 and a vehicle communication bus 112 that is connected to various vehicle components 114, various sensors 116, and multimedia system 118 in mobile vehicle 110. DSP 122 can activate various programming and operation modes, as well as provide for data transfers. In facilitating interactions among the various communication and electronic modules, vehicle communication bus 112 utilizes bus interfaces such as controller-area network (CAN), J1850, International Organization for Standardization (ISO) Standard 9141, ISO Standard 11898 for high-speed applications, and ISO Standard 11519 for lower speed applications.

Mobile vehicle 110 via telematics unit 120 sends and receives radio transmissions from wireless carrier system 140, or satellite carrier system 141. Wireless carrier system 140, or satellite carrier system 141 is any suitable system for transmitting a signal from mobile vehicle 110 to communication network 142.

Communication network 142 includes services from mobile telephone switching offices, wireless networks, public-switched telephone networks (PSTN), and Internet protocol (IP) networks. Communication network 142 comprises a wired network, an optical network, a fiber network, another wireless network, or any combination thereof. Communication network 142 connects to mobile vehicle 110 via wireless carrier system 140, or satellite carrier system 141.

Communication network 142 can send and receive short messages according to established protocols such as dedicated short range communication standard (DSRC), IS-637 standards for short message service (SMS), IS-136 air-interface standards for SMS, and GSM 03.40 and 09.02 standards. In one embodiment of the invention, similar to paging, an SMS communication is posted along with an intended recipient, such as a communication device in mobile vehicle 110.

Call center 180 is a location where many calls are received and serviced at the same time, or where many calls are sent at the same time. In one embodiment of the invention, the call center is a telematics call center, facilitating communications to and from telematics unit 120 in mobile vehicle 110. In another embodiment, the call center 180 is a voice call center, providing verbal communications between a communication service advisor 185, in call center 180 and a subscriber. In another embodiment, call center 180 contains each of these functions.

Communication services advisor 185 is a real advisor or a virtual advisor. A real advisor is a human being in verbal communication with a user or subscriber. A virtual advisor is a synthesized speech interface responding to requests from user or subscriber. In one embodiment, the virtual advisor includes one or more recorded messages. In another embodiment, the virtual advisor generates speech messages using a call center based text to speech synthesizer (TTS). In another embodiment, the virtual advisor includes both recorded and TTS generated messages.

Call center 180 provides services to telematics unit 120. Communication services advisor 185 provides one of a number of support services to a subscriber. Call center 180 can transmit and receive data via a data signal to telematics unit 120 in mobile vehicle 110 through wireless carrier system 140, satellite carrier systems 141, or communication network 142.

Call center 180 can determine mobile identification numbers (MINs) and telematics unit identifiers associated with a telematics unit access request, compare MINs and telematics unit identifiers with a database of identifier records, and send calling-state messages to the telematics unit 120 based on the request and identification numbers.

In one embodiment of the invention call center has a plurality of remote communication devices, such as a bank of modems 182, used to initiate call signals into telematics unit 120. The modems 182 dial the telematics unit 120 using the MIN associated with that telematics unit. Telematics unit 120, through embedded phone 134, receives the call signals. Call center 180 controls modems 182 and can determine which modem has established communication with telematics unit 120. Call center 180 also determines a service priority assigned to a requested service. Backend connections 186 to modems 182 store connection data regarding attempts to establish communication between the modems 182 and the telematics unit 120. Connection data is stored in call center database 188. Call Center 180 uses connection data to calculate call offsets and to optimize communication to telematics unit 120.

Communication network 142 connects wireless carrier system 140 or satellite carrier system 141 to a user computer 150, a wireless or wired phone 160, a handheld device 170, such as a personal digital assistant, and call center 180. User computer 150 or handheld device 170 has a wireless modem to send data through wireless carrier system 140, or satellite carrier system 141, which connects to communication network 142. In another embodiment, user computer 150 or handheld device 170 has a wired modem, which connects to communications network 142. Data is received at call center 180. Call center 180 has any suitable hardware and software capable of providing web services to help transmit messages and data signals from user computer 150 or handheld device 170 to telematics unit 120 in mobile vehicle 110.

Figure 2:
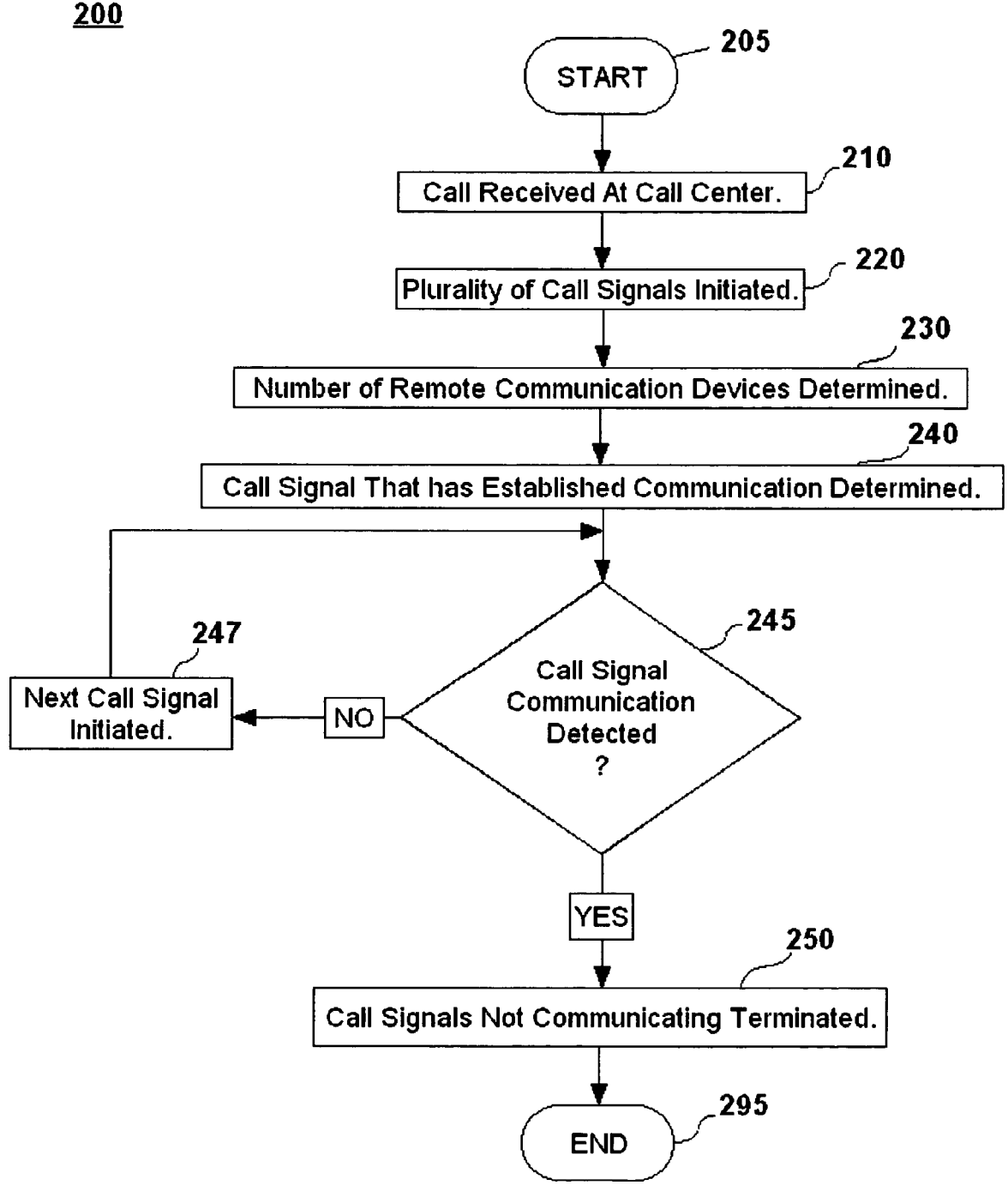
FIG. 2 is a flow diagram of a method for establishing communication to a mobile module in accordance with one embodiment of the current invention.

FIG. 2 is a flow diagram of a method for establishing communication to a mobile module in accordance with one embodiment of the current invention at 200. The method for establishing communication to a mobile module, such as a telematics unit, at 200 begins (block 205) when a call is received at a call center from a subscriber requesting a service (block 210). The call center initiates a plurality of call signals into the mobile module from a plurality of remote communication devices (block 220). A number of remote communication devices from which to initiate the plurality of call signals is determined based on a service priority assigned to a requested service (block 230). The service priority is determined from a service priority table that comprises a list of services and a service priority, such as high or low, that is assigned to each service. Call signals are initiated in a timed sequence wherein each call signal in the timed sequence is separated by a call time increment. Each successive call signal has a call signal position in the timed sequence irrespective of which remote communication device initiates the call signal. The first call signal generated is in position 1, the second call signal generated is in position 2, and so on. Which of the plurality of call signals has established communication with the mobile module is determined (block 240).

Figure 3:
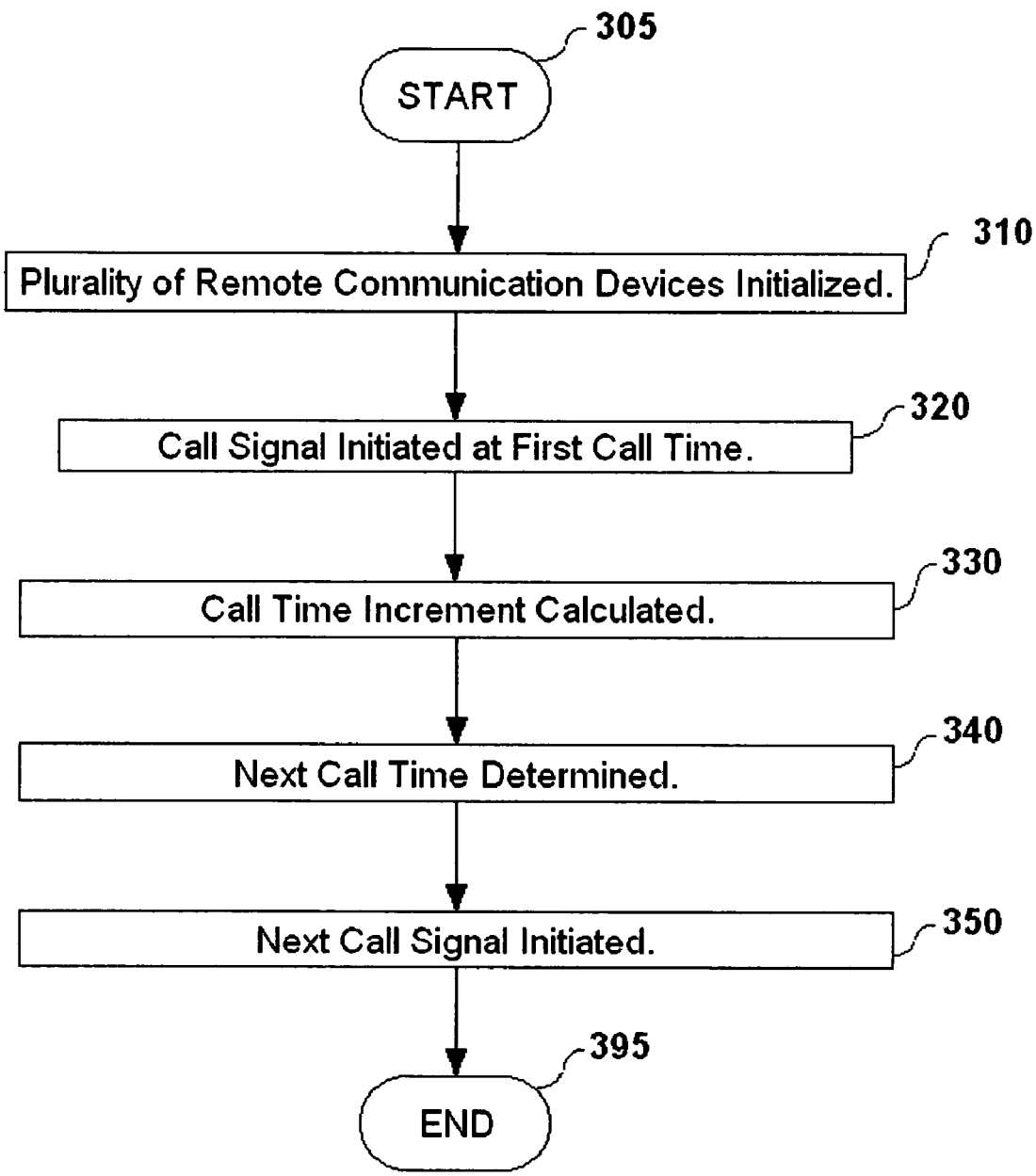
FIG. 3 is a flow diagram detailing the step of initiating the plurality of call signals into the mobile module from a plurality of remote communication devices at block 220 of FIG. 2.

The determination is made by detecting whether a call signal in the timed sequence has established communication with the mobile module prior to initiating a next call signal (block 245). A call signal has established communication with the mobile module when an authenticated connection, between the remote communication device and the mobile module, occurs. The mobile module accepts the call signal and sends a connection signal back to the remote communication device. If a call signal in the timed sequence has not established communication with the remote module, a next call signal is generated (block 247) and the detection (block 245) is repeated. If a call signal in the timed sequence has established communication with the remote module, a next call signal is not generated and the call signals that have not established communication are terminated (block 250) and the method ends (block 295). The call signals are terminated by sending a disengage command to the remote communication devices that are active but have not established communication with the mobile module. The hang up command is sent when the remote communication devices are modems FIG. 3 is a flow diagram detailing the step of initiating the plurality of call signals into the mobile module from a plurality of remote communication devices at block 220 of FIG. 2. The step of initiating the plurality of call signals into the mobile module from a plurality of remote communication devices at 300 begins (block 305) when the plurality of remote communication devices are initialized at the call center (block 310). The timed sequence starts when the first remote communication device initiates a call signal into the mobile module at a first call time (block 320). A call time increment is calculated using the call signal position in the timed sequence "N" and a determined time constant "X" (block 330). The call time increment is calculated based on the formula (N−1)X. The time constant is determined empirically, for any mobile module, based on the module's performance in its respective network or location. A next call time is determined by adding the call time increment to the first call time (block 340) and a next call signal is initiated at the next call time (block 350). The step repeats until communication is established between a remote communication device and the mobile module and the step ends (block 395).

Figure 4:
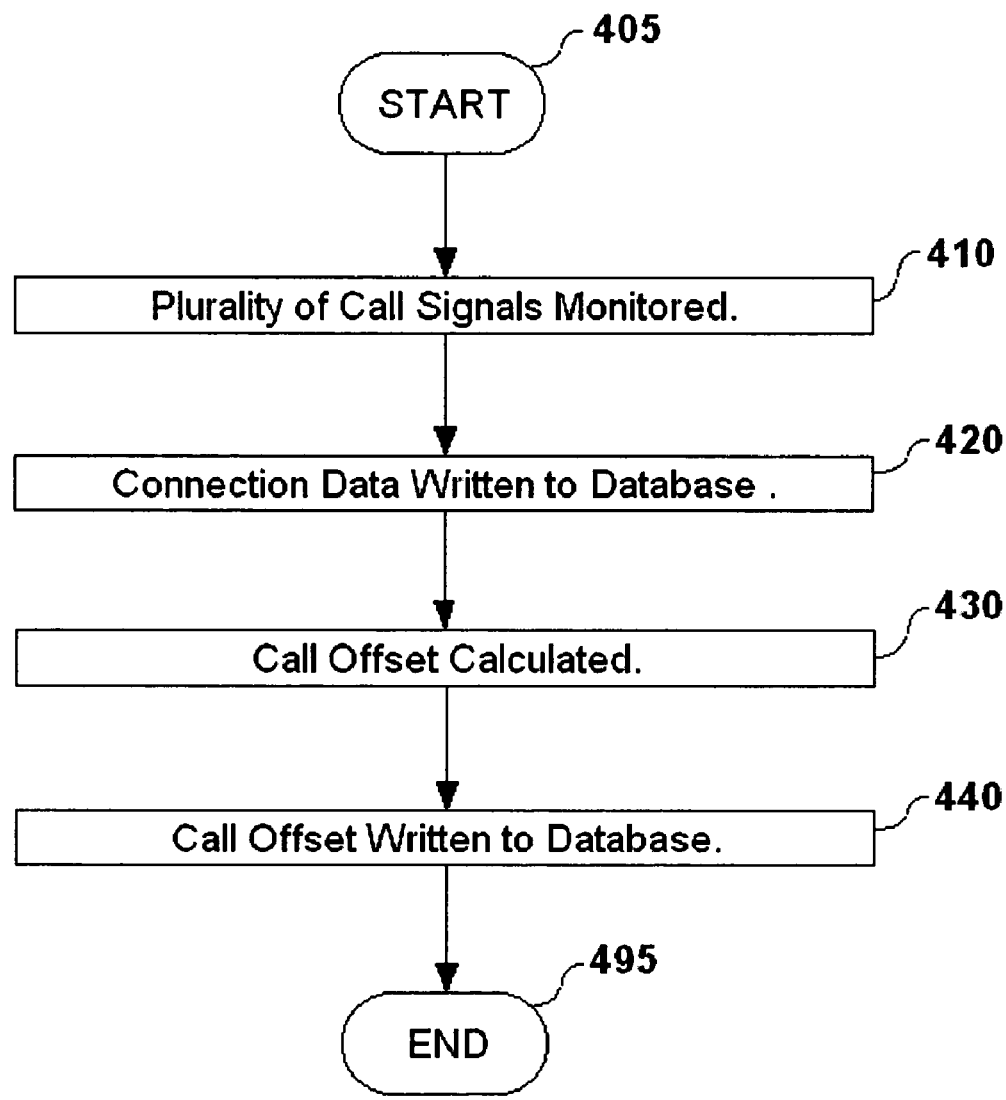
FIG. 4 is a flow diagram for a method of calculating call offsets in accordance with one embodiment of the current invention.

FIG. 4 is a flow diagram for a method of calculating call offsets in accordance with one embodiment of the current invention. The method for calculating call offsets at 400 begins (block 405) with monitoring the plurality of call signals into the mobile module for connection data (block 410). Backend connections to the remote communication devices are able to store information about the outbound call signals. The connection data for the mobile module is written to a connection database (block 420). Connection data for a particular mobile module comprises information regarding the optimal time in the mobile module's wakeup period to initiate a call signal to the mobile module and the time required for establishing communication with the mobile module. This connection data is then used to calculate a call offset for the module (block 430). The call offset is amount of time elapsed from when the first call signal is sent to when communication is established to the mobile module. The call offsets are written to the connection database (block 440). The call offsets are used to optimize communications into the mobile module. By minimizing the value of the call offset the call center can determine the optimal time in the mobile module's wake up period to initiate call signals. The method ends (block 495).

Figure 5:
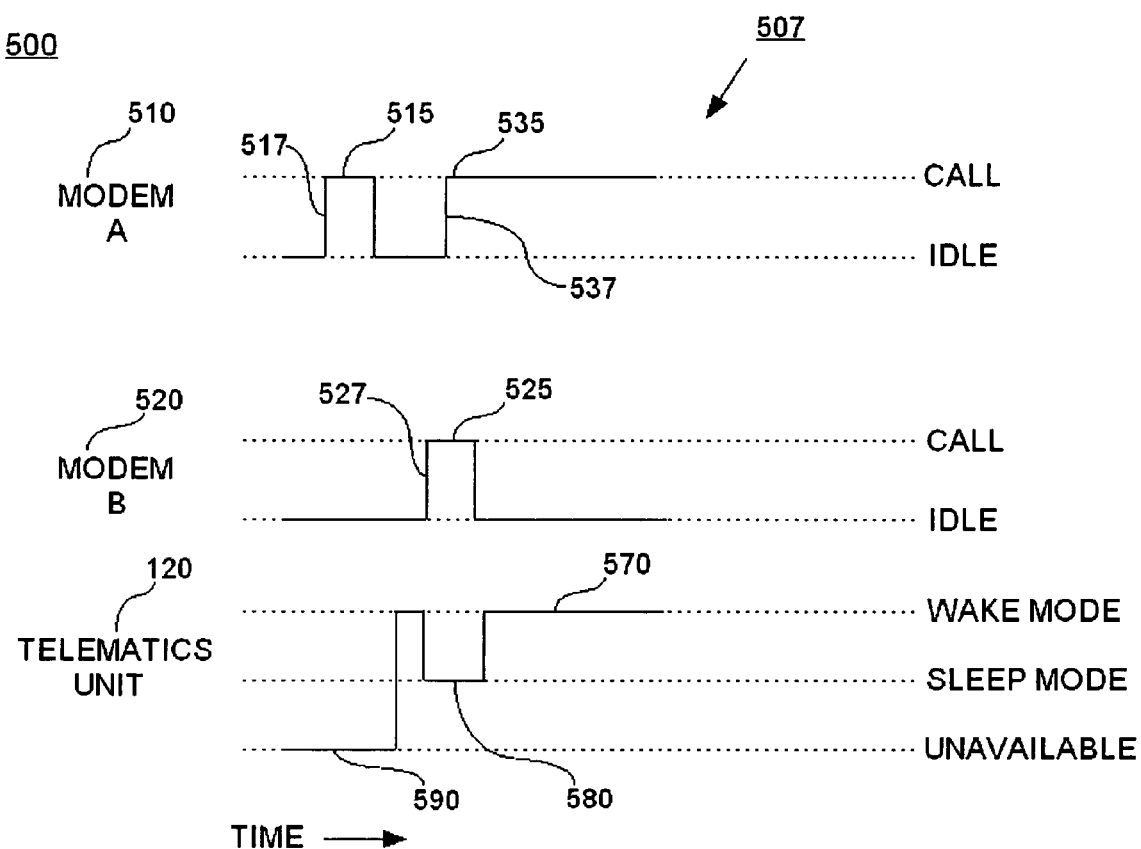
FIG. 5 is a diagram illustrating an exemplary embodiment of the current invention for establishing communication to a mobile module using a first remote communication device and a second remote communication device.

FIG. 5 is a diagram illustrating an exemplary embodiment of the current invention for establishing communication to a mobile module using a first remote communication device and a second remote communication device at 500. The first communication device is modem A 510 and the second communication device is modem B 520 and the mobile module is a telematics unit 120. The timed sequence starts 507 when modem A 510 initiates a first call signal 515 into the telematics unit at the first call time 517. Modem B 520 initiates a second call signal 525 into the telematics unit 120 at the first call time plus the time increment (N−1)X seconds 527, where N is the call signal's position in the timed sequence and X is the determined time constant. Here, N=2 since modem B device initiates the second call signal. The next call signal, which is a third call signal 535, is generated at the first call time plus (N−1)X seconds 537. In this example modem A 510 initiates the third call signal 535 in the timed sequence (N=3). Call signal generation continues until communication is established with the telematics unit 120. Communication is established with telematics unit only when the telematics unit is in a wake state 570. If a telematics unit is in a sleep state 580 or is unavailable 590 the call signal can not establish communication with the telematics unit 120.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for establishing communication to a mobile module, the method comprising:
   initiating a plurality of call signals into the mobile module from a plurality of remote communication devices based on a timed sequence;
   determining which of the plurality of call signals has established communication with the mobile module; and
   terminating the call signals that have not established communication based on the determination.

2. The method of claim 1 further comprising:
   determining whether a call signal in the timed sequence has established communication with the mobile module prior to initiating a next call signal; and
   initiating the next call signal based on the determination.

3. The method of claim 1 wherein the step of initiating a plurality of call signals into the mobile module from a plurality of remote communication devices based on a timed sequence comprises:
   initiating a first call signal at a first call time;
   calculating a call time increment;
   determining a next call time by adding the call time increment to the first call time; and
   initiating a next call signal at the next call time.

4. The method of claim 1 wherein each call signal has a call signal position in the timed sequence.

5. The method of claim 4 wherein the call time increment is a function of the call signal position and a determined time constant.

6. The method of claim 1 further comprising:
   monitoring the plurality of call signals into the mobile module for connection data;
   writing the connection data for the mobile module to a call database; and
   calculating a call offset for the mobile module based on the connection data for module in the call database.

7. The method of claim 1 further comprising:
   determining a number of remote communication devices from which to initiate the plurality of call signals based on a service priority.

8. The method of claim 7 wherein the service priority is predetermined at a call center.

9. The method of claim 1 wherein the call signals are initiated sequentially.

10. The method of claim 1 wherein the plurality of remote communication devices is a bank of modems for generating the plurality of call signals.

11. A system for establishing communication to a mobile module comprising:
    means for initiating a plurality of call signals into the mobile module from a plurality of remote communication devices based on a timed sequence;
    means for determining which of the plurality of call signals has established communication with the mobile module; and
    means for terminating the call signals that have not established communication based on the determination.

12. The system of claim 11 further comprising:
    means for determining whether a call signal in the timed sequence has established communication with the mobile module prior to initiating a next call signal; and
    means for initiating the next call signal based on the determination.

13. The system of claim 11 wherein each call signal has a call signal position in the timed sequence.

14. The system of claim 13 wherein the call time increment is a function of the call signal position and a determined time constant.

15. The system of claim 11 further comprising:
    means for monitoring the plurality of call signals into the mobile module for connection data;
    means for writing the connection data for the mobile module to a call database; and
    means for calculating a call offset for the mobile module based on the connection data for the module in the call database.

16. The system of claim 11 further comprising:
    means for determining a number of remote communication devices from which to initiate the plurality of call signals based on a service priority.

* * * * *